(12) United States Patent
Kawai

(10) Patent No.: US 8,275,861 B2
(45) Date of Patent: Sep. 25, 2012

(54) TECHNIQUE FOR COMMUNICATING BY UTILIZING COMMUNICATION SETTING INFORMATION

(75) Inventor: Sunao Kawai, Nagoya (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 496 days.

(21) Appl. No.: 12/276,684

(22) Filed: Nov. 24, 2008

(65) Prior Publication Data
US 2009/0144401 A1    Jun. 4, 2009

(30) Foreign Application Priority Data
Nov. 29, 2007   (JP) ................................. 2007-308138

(51) Int. Cl.
G06F 15/177    (2006.01)
(52) U.S. Cl. ....................................... 709/220; 358/1.15
(58) Field of Classification Search .................. 709/236, 709/235, 232, 231, 230, 229, 228, 224, 217, 709/208, 207, 206, 204, 225, 21; 455/557, 455/556.1, 553.1, 518, 455, 417, 414.1; 370/469, 370/468, 466, 432, 429, 419, 401; 726/18, 726/15, 1; 718/102; 713/189, 187, 173, 713/169, 168, 155
See application file for complete search history.

(56) References Cited

U.S. PATENT DOCUMENTS

| | | | |
|---|---|---|---|
| 5,790,785 A | 8/1998 | Klug et al. | |
| 2002/0111179 A1* | 8/2002 | Tanaka et al. | 455/517 |
| 2002/0160765 A1* | 10/2002 | Okajima | 455/419 |
| 2003/0200285 A1 | 10/2003 | Hansen et al. | |
| 2005/0099962 A1* | 5/2005 | Matsuda | 370/254 |
| 2006/0129658 A1 | 6/2006 | Kawai | |
| 2007/0082699 A1* | 4/2007 | Karaoguz et al. | 455/553.1 |
| 2007/0258367 A1 | 11/2007 | Ikeda | |
| 2008/0163343 A1* | 7/2008 | Kudo | 726/4 |

FOREIGN PATENT DOCUMENTS

| | | |
|---|---|---|
| JP | 10-283142 A | 10/1998 |
| JP | 2006-085643 | 3/2006 |
| JP | 2006-173680 | 6/2006 |
| JP | 2006-215926 A | 8/2006 |
| JP | 2006-252023 | 9/2006 |
| JP | 2007-257525 A | 10/2007 |
| JP | 2008-165444 | 7/2008 |

OTHER PUBLICATIONS

Extended EP Search Report dtd Jun. 17, 2009, EP Appln. 08253823.2.
JP Notification of Reasons for Rejection dated Sep. 13, 2011; corresponding Application No. 2007-308138; English Translation.

* cited by examiner

Primary Examiner — David Lazaro
Assistant Examiner — Charles Murphy
(74) Attorney, Agent, or Firm — Banner & Witcoff, Ltd.

(57) ABSTRACT

A communication device is configured to connect with a network including a plurality of types of external devices. The communication device is provided with a spec storage device, a type obtaining device, and a communication attempt device. The spec storage device is configured to store an association of a type of external device and a spec of communication setting information which is capable of being set in the type of external device. The type obtaining device is configured to obtain type information of each external device. The communication attempt device is configured to attempt to communicate with each external device by utilizing communication setting information which complies with the spec associated with the obtained type information of external device by the type obtaining device.

10 Claims, 10 Drawing Sheets

Printer Network System 10

FIG. 3

Spec Table Storage Area  32

|     |                    |                                              |
|-----|--------------------|----------------------------------------------|
| 102→ | Vendor Name:       | X                                            |
| 104→ | Product Name:      | Common                                       |
| 106→ | Default User Name: | admin(1~32Letters; Changeable)               |
| 108→ | Authentication Key: | pass(1~32Letters; Changeable)               |
| 110→ | Encryption Key:    | pass(1~32Letters; Changeable)                |
| 112→ | Context:           | Xcompany(1~32Letters; Changeable)            |

100 brackets 102–112

120:
- Vendor Name: Y
- Product Name: Common
- Default User Name: root(1~32Letters; Changeable)
- Authentication Key: root(1~32Letters; Changeable)
- Encryption Key: root(1~32Letters; Changeable)
- Context: Ycompany(Fixed)

130:
- Vendor Name: Y
- Product Name: FAX2000
- Default User Name: root(1~32Letters; Changeable)
- Authentication Key: 00,01,02,03,04,05,06,07 (Hex Number 8 Items; Changeable)
- Encryption Key: 00,01,02,03,04,05,06,07 (Hex Number 8 Items; Changeable)
- Context: Ycompany(Fixed)

FIG. 4

Device Table Storage Area 34

| | Address (140) | Vendor Name (142) | Product Name (144) |
|---|---|---|---|
| 150 → | 192.168.0.2 | X | FAXPRINT-01 |
| 152 → | 192.168.0.3 | X | FAXPRINT-02 |
| 154 → | 192.168.0.4 | Y | OFFICELASER-100 |
| 156 → | 192.168.0.5 | Y | FAX2000 |
| | | | |

FIG. 5

Combination Table Storage Area 36

160:
- 162 → User Name: admin
- 164 → Authentication Key: ABCDEFGH(ASCII)
- 166 → Encryption Key: 12345678(ASCII)
- 168 → Context: Xcompany Setting 1

170:
Setting 2
- User Name: root
- Authentication Key: 00,01,02,03,04,05,06,07 (Hex Number Binary)
- Encryption Key: 00,01,02,03,04,05,06,07 (Hex Number Binary)
- Context: Ycompany

FIG. 6

Security Setting Information
Storage Area 38

180 {
- 182 → User Name: admin
- 184 → Authentication Key: ABCD
- 186 → Encryption Key: 1234
- 188 → Context: Xcompany

FIG. 7

Success Setting Information
Storage Area 40

| Address (190) | Security Setting Information (Succeeded Examples) (192) |
|---|---|
| 192.168.0.2 | User Name: ..... <br> Authentication Key: ..... <br> Encryption Key: ..... <br> Context: ..... } 200 |
| 192.168.0.3 | User Name: ..... <br> Authentication Key: ..... <br> Encryption Key: ..... <br> Context: ..... } 210 |
|  |  |

TECHNIQUE FOR COMMUNICATING BY UTILIZING COMMUNICATION SETTING INFORMATION

CROSS-REFERENCE TO RELATED APPLICATION

This application claims priority to Japanese Patent Application No. 2007-308138, filed on Nov. 29, 2007, the contents of which are hereby incorporated by reference into the present application.

BACKGROUND OF THE INVENTION

1. Field of the Invention

The technique disclosed in this specification relates to a technique for communicating by utilizing communication setting information.

2. Description of the Related Art

There is a type of communication protocol among communication protocols which allow mutual communication of two devices, as far as communication setting information used by these two devices complies with each other. For example, SNMPv3 (Simple Network Management Protocol Version3) allows mutual communication of two devices as long as user names, authentication keys, encryption keys, and contexts used by these two devices correspond to each other. For example, US Patent Application Publication No. 2006/129658 (hereinafter, referred to as Patent Document 1) discloses a communication device which communicates with a plurality of external devices.

BRIEF SUMMARY OF THE INVENTION

Depending on a type of external device, a spec (i.e., a rule, a standard, or specification) of the communication setting information that can be set in the external device may differ. There may be a case in which, a first type of external device capable of setting a discretional letter string of 1 to 32 letters as an authentication key exists, while on the other hand, a second type of external device capable of setting only discretional hexadecimal eight items as an authentication key exists. In this case, when communication setting information complying with the first type of external device is used, it is possible to communicate with the first type of external device, but may be impossible to communicate with the second type of external device.

The technique disclosed in the above patent document 1 is based on the premise that communication setting information is common in all the external devices that are subject to the communication. In this specification, provided is a technique which is capable of efficiently communicating with a plurality of types of external devices even if the plurality of types of external devices are connected with a network, and specs of the communication setting information capable of being set in the respective external devices are different.

A technique disclosed in this specification is a communication device configured to connect with a network including a plurality of types of external devices. The word "external device" described above should be most broadly interpreted, and is a concept which includes every device constituted separately from the communication device. As an example of such external devices, a personal computer, a server, a printer, a scanner, a multi-function device, a portable terminal and the like may be quoted.

The communication device described above is provided with a spec storage device, a type obtaining device, and a communication attempt device. The spec storage device is configured to store an association of a type of external device and a spec of communication setting information which is capable of being set in the external device. The type obtaining device is configured to obtain type information of each external device. The communication attempt device is configured to attempt to communicate with each external device by utilizing communication setting information which complies with the spec associated with the obtained type information of external device obtained by the type obtaining device.

The above communication device stores a spec of communication information for each type of external device. The communication device attempts to communicate with an external device that is subject to communication by utilizing communication setting information which complies with the spec of the external device. More specifically, the communication device attempts to carry out communication by utilizing communication setting information by which communication establishment is expected (i.e., communication setting information which complies with the spec of the external device), while the communication device does not attempt to carry out communication by using communication setting information by which communication failure is expected (communication setting information which does not complies with a spec of an external device). Therefore, the communication device is capable of efficiently communicating with a plurality of types of external devices.

BRIEF DESCRIPTION OF THE DRAWINGS

FIG. 3 shows an example of storage contents of a spec table storage area.
FIG. 4 shows an example of storage contents of a device table storage area.
FIG. 5 shows an example of storage contents of a combination table storage area.
FIG. 6 shows an example of storage contents of a security setting information storage area.
FIG. 7 shows an example of storage contents of a success setting information storage area.

DETAILED DESCRIPTION OF THE PREFERRED EMBODIMENT (Embodiment)
(Configuration of System)

Figure 1:
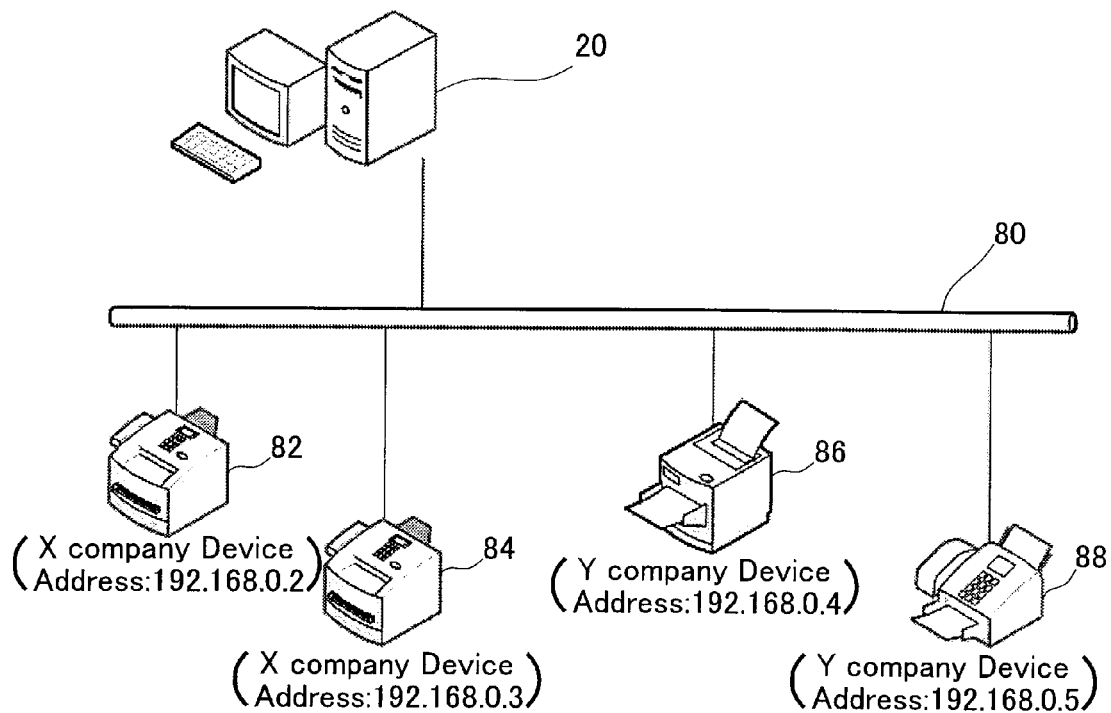
FIG. 1 shows a configuration of a printer network system.

An embodiment will be described with reference to the accompanying drawings. FIG. 1 shows a printer net work system 10 according to this embodiment. The printer network system 10 is provided with a management device 20, a plurality of printer devices (a facsimile, a copy machine, a complex machine, and the like are included) 82, 84, 86, and 88. Each of the devices 20 and 82 to 88 is connected with a communication line 80 such as a LAN and/or an internet line. FIG. 1 shows a manufacture and an IP address of each of the printer devices 82 to 88. For example, the manufacturer of the printer device 82 is X company and the printer device 82 has an IP address "192.168.0.2." Further, the manufacturer of the printer device 86 is Y company and the printer device 86 has an IP address "192.168.0.4."

(Configuration of Management Device)

The management device 20 according to this embodiment can obtain status information (running out of ink, toner, and paper, jam, and the like) of each of the printer devices 82 to 88 by communicating with each of the printer devices 82 to 88. The management device 20 can carry out communication by utilizing SNMPv3 (Simple Network Management Protocol Version3). Security setting information to be used in SNMPv3 is a user name, an authentication key, an encryption key, and a context.

Figure 2:
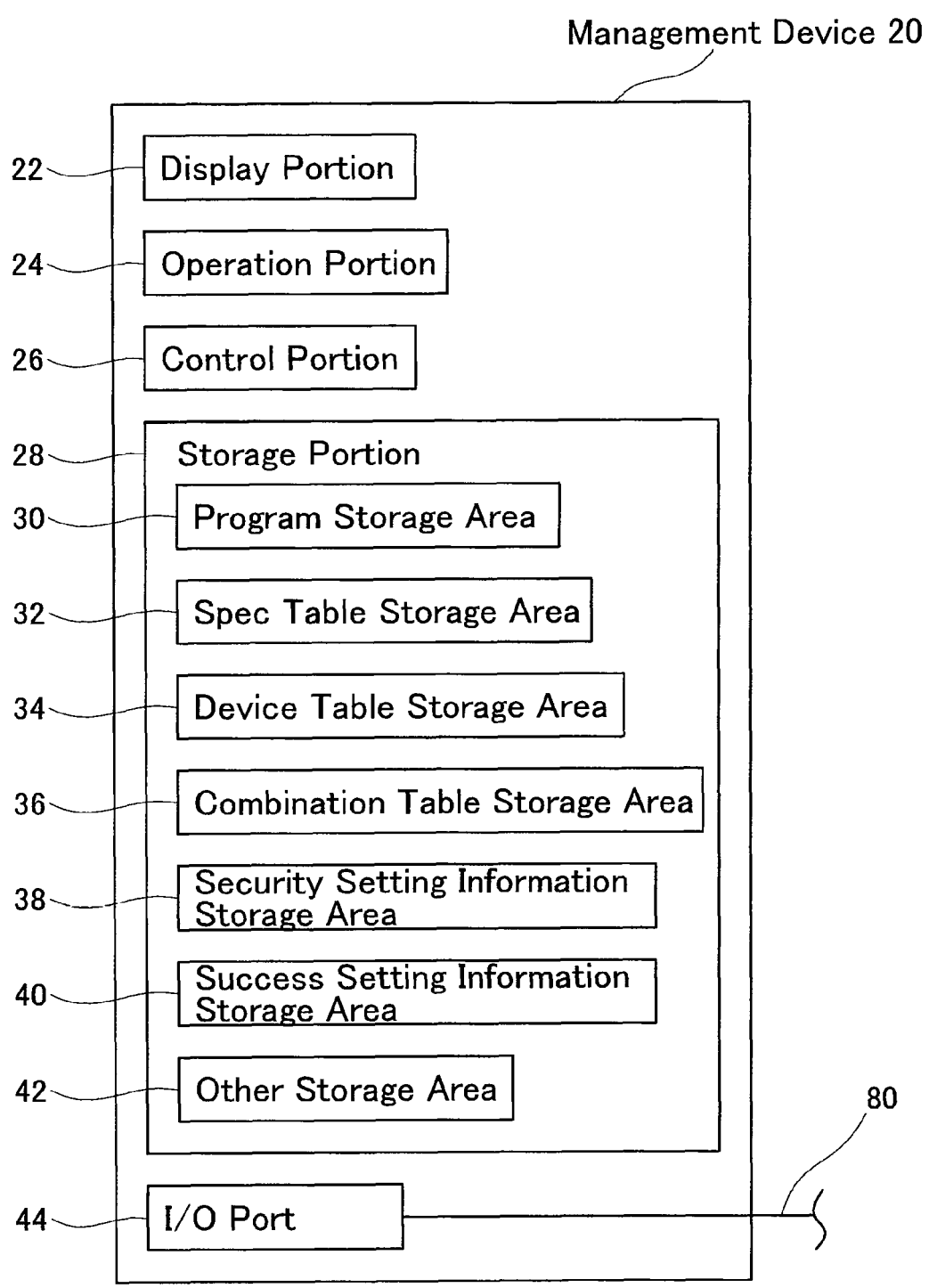
FIG. 2 shows a configuration of a management device.

FIG. 2 shows a configuration of the management device 20. The management device 20 has a display portion 22, an operation portion 24, a control portion 26, a storage portion 28, an I/O port 44, and the like. The display portion 22 can display various kind of information. For example, status information of each of the printer devices 82 to 88 can be displayed. The operation portion 24 is composed of a keyboard and a mouse. A user can input various information and instructions into the management device 20 by operating the operation portion 24. The control portion 26 carries out various processes according to a program stored in the storage portion 28. Contents of the processes to be carried out by the control portion 26 will be described in detail later. The storage portion 28 is composed of a ROM, an EEPROM, a RAM, and the like. The storage portion 28 has various storage areas 30 to 42. Contents of information which have to be stored in each of the storage areas 30 to 42 will be particularly described later. The I/O port 44 is connected with the communication line 80. The management device 20 can communicate with each of the printer devices 82 to 88 via the I/O port 44 and the communication line 80.

Each of the storage areas 30 to 42 of the storage portion 28 will be described in detail. In the program storage area 30, a program to be carried out by the control portion 26 is stored. The program is installed from a program storage medium into the management device 20.

FIG. 3 shows an example of storage contents of the spec table storage area 32. The storage contents of the spec table storage area 32 are those which are installed from the storage medium into the management device 20 together with the program described above. In the spec table storage area 32, spec information 100, 120, and 130 are stored for each type of printer device. The types of printer devices are classified by manufacturers and/or product names. For example, the spec information 100 is spec information which is common to all the products of the manufacturer X. The spec information 120 is spec information which is common to all the products (except for FAX 2000 to be described later) of the manufacturer Y. The spec information 130 is spec information of a product "FAX 2000" of the manufacturer Y.

Each of the spec information 100, 120, and 130 is information with which a manufacturer's name (vendor name), a product name, a default user name, a default authentication key, a default encryption key, and a default context are associated. The spec information 100 will be described in detail. In the spec information 100, a vendor name 102 is "X" and a product name 104 is "common." The "common" represents spec information which is common to all the products. Further, a default user name 106 includes a user name (default user name) "admin," which is set in the printer device at the time of shipment of products, and a spec "discretional letter string of 1 to 32 letters" of the user name. A default authentication key 108 includes a default key (default authentication key) "pass," which is set in the printer device at the time of shipment of products, and a spec "discretional letter string of 1 to 32 letters" of the authentication key. A default encryption key 110 includes an encryption key (default encryption key) "pass," which is set in the printer device at the time of shipment of products, and a spec "discretional letter string of 1 to 32 letters" of the encryption key. A default context 112 includes a context (default context) "Xcompany," which is set in the printer device at the time of shipment of products, and a spec "discretional letter string of 1 to 32 letters" of the context.

The other spec information 120 and 130 includes information similar to that of the spec information 100. Points different from the spec information 100 will be enumerated below. A vendor name of the spec information 120 is "Y." A default user name, a default authentication key, and a default encryption key of the spec information 120 are "root." A default context of the spec information 120 is "Y company." A context of the spec information 120 is fixed and cannot be changed. A vendor name of the spec information 130 is "Y" and a product name of the spec information 130 is "FAX2000." A default user name of the spec information 130 is "root." A default authentication key and a default encryption key of the spec information 130 are "00, 01, 02, 03, 04, 05, 06, and 07." An authentication key and an encryption key of the spec information 130 have to be expressed in hexadecimal eight items. A default context of the spec information 130 is "Ycompany." A context of the spec information 130 is fixed and cannot be changed.

FIG. 4 shows an example of storage contents of the device table storage area 34. The storage contents of the device table storage area 34 results from acquisition of information by the management device 20. The way the information is stored in the device table storage area 34 will be described in detail later. The device table storage area 34 stores device information 150 to 156 with which an address 140, vendor name 142, and a product name 144 are associated. The device information 150 corresponds to the printer device 82 shown in FIG. 1. Similarly, the device information 152, 154, and 156 corresponds to the printer devices 84, 86, and 88 shown in FIG. 1.

FIG. 5 shows an example of storage contents of the combination table storage area 36. Storage contents of the combination table storage area 36 are input by a user. A user can cause the combination table storage area 36 to store (also can change or delete) information by operating the operation portion 24. The combination table storage area 36 can store a plurality of security communication setting information 160 and 170. The security communication setting information 160 includes a user name 162, an authentication key 164, an encryption key 166, and a context 168. Security communication setting information 170 also includes similar information.

FIG. 6 shows an example of storage contents of the security setting information storage area 38. The way information is stored in the security setting information storage area 38 will be described in detail later. The security setting information storage area 38 stores security setting information which is utilized by the management device 20 at the time of communication. According to an example shown in FIG. 6, security setting information 180 includes a user name 182, an authentication key 184, an encryption key 186, and a context 188.

FIG. 7 shows an example of storage contents of the success setting information storage area 40. The way information is stored in the success setting information storage area 40 will be described in detail later. The success setting information storage area 40 can store information with which an address 190 and security communication setting information 192 are associated. For example, security communication setting information 200 is associated with an address "192.168.0.2" and security communication setting information 210 is associated with an address "192.168.0.3."

The storage area 42 can store information other than information which has to be stored in each of the storage areas 30 to 40 described above. The information which has to be stored in the storage area 42 will be described later on demand.

(Process of Obtaining Device Information)

Figure 8:
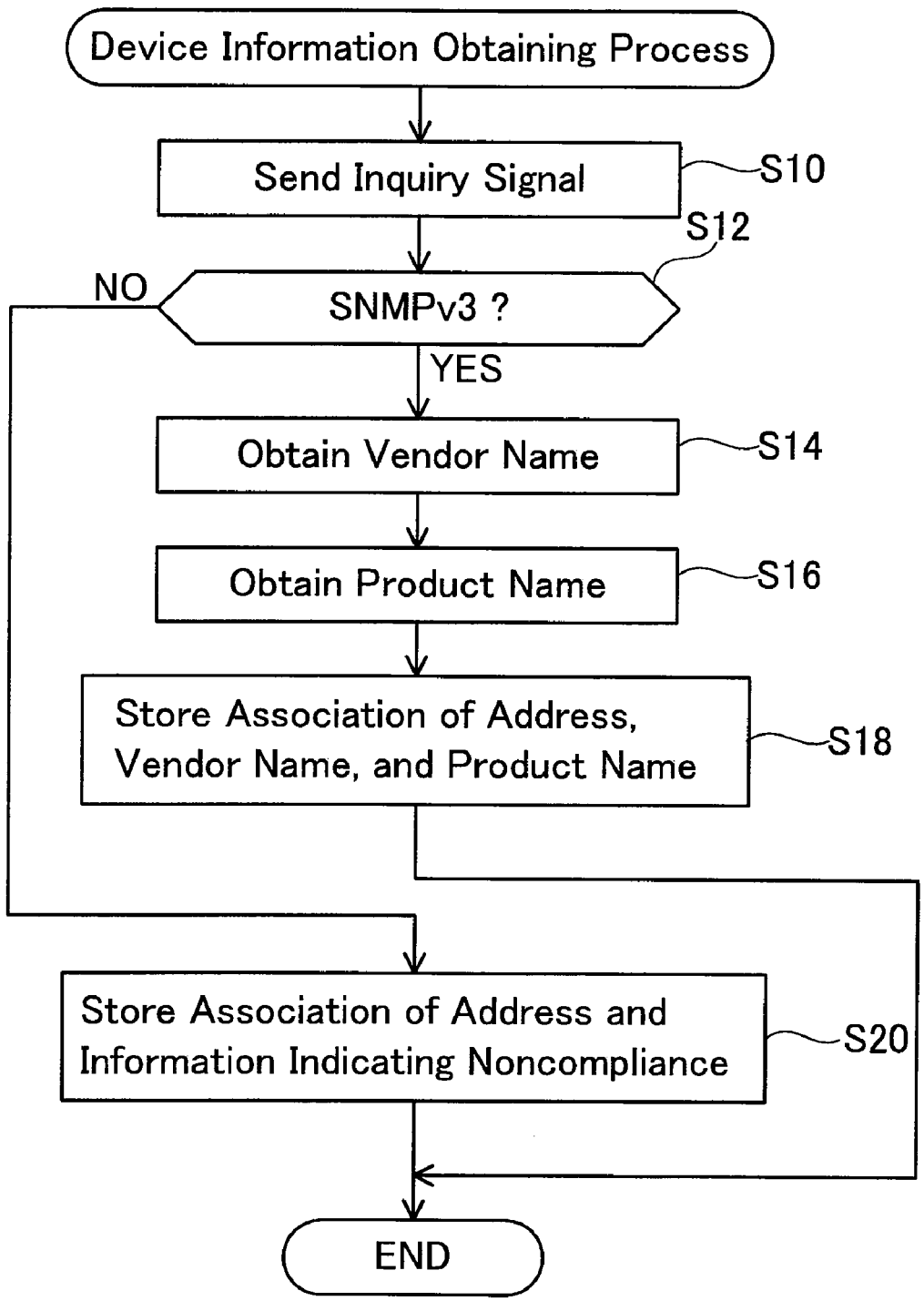
FIG. 8 shows an example of a flow chart of a device information obtaining process.

Subsequently, contents of a device information obtaining process to be carried out by the control portion 26 will be described. FIG. 8 shows a flow chart of the device information obtaining process. The device information obtaining process is performed at prescribed timing (for example, at startup of the management device 20). The control portion 26 carries out the device information obtaining process by utilizing SNMPv1 (Simple Network management Protocol Version1). This SNMPv1 is a communication protocol in which authentication and encryption are not carried out. In other words, a user name, an authentication key, an encryption key, and a context are not required for communication. In this point, it is different from SNMPv3.

The control portion 26 transmits an inquiry signal to the printer devices 82 to 88 (at Step 10). This inquiry signal is for making inquiries about functions of the printer devices. This inquiry signal can be transmitted by utilizing a broad cast, a multi-cast, or a uni-cast. In a case of the multi-cast and the uni-cast, it is required that IP addresses of the printer devices 82 to 88 subject to communication are previously stored in the storage portion 28 (for example, the storage area 42). For example, a user can cause the storage portion 28 to store the IP addresses of the printer devices 82 to 88 by operating the operation portion 24. A case where the inquiry signal is transmitted by utilizing the unicast will be described below. The control portion 26 carries out processes at Step 10 to Step 20 for one printer device, and after the completion of the processes, the control portion 26 carries out processes at Step 10 to Step 20 for another printer device. The control portion 26 carries out processes at Step 10 to Step 20 for each of all the printer devices.

The printer device sends information in reply to an inquiry signal. The information to be sent in reply includes information that there is the function of SNMPv3 (first information), information that there is no function of SNMPv3 (second information), or information that reply to the inquiry is not available (third information). In a case where the first information is sent in reply, the control portion 26 makes an affirmative judgment at Step 12. In a case where the third information is obtained, the control portion 26 also makes an affirmative judgment at Step 12. On the other hand, in a case where the second information is sent in reply, the control portion 26 makes a negative judgment at Step 12.

An affirmative judgment is made at Step 12, the control portion 26 obtains information as to a vendor name (at Step 14). A vendor name may be included in the reply to the inquiry signal. In this case, the control portion 26 obtains the vendor name by analyzing the reply to the inquiry signal. Further, a vendor name may not be included in the reply to the inquiry signal. In this case, the control portion 26 obtains the vendor name by making an inquiry about the vendor name to the printer device which is a responder. Subsequently, the control portion 26 obtains information as to a product name (at Step 16). The product name may be included in the reply to the inquiry signal. In this case, the control portion 26 obtains the product name by analyzing the reply to the inquiry signal. Further, the product name may not be included in the reply to the inquiry signal. In this case, the control portion 26 obtains the product name by making an inquiry about the product name to the printer device which is a responder. Subsequently, the control portion 26 stores an association of an IP address of the printer device which is a designation of the inquiry signal at Step 10, the vendor name obtained at Step 14, and the product name obtained at Step 16. This information is stored in the device table storage area 34 (refer to FIG. 4).

On the other hand, in a case where a negative judgment is made at Step 12, the control portion 26 stores an association of the IP address of the printer device which is a designation of the inquiry signal at Step 10 and the information that there is no function of SNMPv3 (at Step 20). This information is also stored in the device table storage area 34 (refer to FIG. 4). It should be noted that the information to be stored at Step 20 is not shown in the example of FIG. 4.

(Communication Process)

Subsequently, contents of the communication processes to be carried out by the control portion 26 will be described. FIGS. 9 to 12 show flow charts of the communication processes. The communication processes are carried out at prescribed timing (for example, at every prescribed period, at the time of inputting prescribed instructions of a user, and the like). In the communication processes according to this embodiment, the control portion 26 obtains status information of each of the printer devices 82 to 88. The control 26 carries out the communication processes by utilizing SNMPv3. Further, the control portion 26 carries out the communication processes shown in FIGS. 9 to 12, only for printer devices having the function of SNMPv3. With regard to printer devices having no function of SNMPv3, the control portion 26 may obtain the status information by carrying out different communication processes (for example, communication processes utilizing SNMPv1). Detailed description about the different communication processes will be omitted.

The control portion 26 makes out an uncommunication list in the storage area 42 of the storage portion 28 (at Step 30). The control portion 26 writes IP addresses of all the printer devices subject to communication into the uncommunication list. Specifically, the control portion 26 specifies an IP address of each printer device having the function of SNMPv3 with reference to storage contents of the device table storage area 34. Subsequently, the control portion 26 writes each IP address specified into the uncommunication list.

Subsequently, the control portion 26 carries out preparation for communication (at Step 32). The control portion 26 writes security setting information into the security setting information storage area 38. More specifically, the control portion 26 writes a user name, an authentication key, an encryption key, and a context into the security setting information storage area 38. The security setting information to be written at Step 32 may be designated by a user. For example, a user can input the security setting information to be utilized for communication by operating the operation portion 24.

The control portion 26 determines whether or not a device (that is, an IP address) exists in the uncommunication list (at Step 34). In a case where a negative judgment is made here, the program advances to Step 60 shown in FIG. 10. On the other hand, in a case where an affirmative judgment is made at Step 34, the control portion 26 selects one device (IP address) from the uncommunication list (at Step 36). Subsequently, the control portion 26 carries out the process at Step 38.

At Step 38, the control portion 26 specifies the vendor name 142 and the product name 144 by retrieving the device table storage area 34 (refer to FIG. 4) in such a manner that an IP address selected at Step 36 is rendered as a key. For example, in a case where the IP address selected at Step 36 is "192.168.0.5," the control portion 26 specifies the vendor name "Y" and the product name "FAX2000" (refer to FIG. 4). Subsequently, the control portion 26 specifies a spec by retrieving the spec table storage area 32 (refer to FIG. 3) in such a manner that the vendor name and the product name specified are rendered as keys. In the case of an example of the vendor name "Y" and the product name "FAX2000" described above, the control portion 26 specifies a spec "discretional letter string of 1 to 32 letters" of a user name, a spec "hexadecimal eight items" of an authentication key, a spec "hexadecimal eight items" of an encryption key, and a spec "Y company (fixed)" of a context. Subsequently, the control portion 26 determines whether or not the security setting information (security setting information which is written at Step 32 or security setting information after a change is made at Step 68 which will be described later), which exists in the security setting information storage area 38 at present, complies with the spec specified (at Step 38).

For example, to take the security setting information shown in FIG. 6 and the spec of "FAX2000" described above as an example, the authentication key "ABCD" and the encryption key "1234" do not comply with the spec. It is because the spec of an authentication key or an encryption key is "hexadecimal eight items." Also, the context "Xcompany" shown in FIG. 6 does not comply with the spec. It is because the spec of a context is "Ycompany." In a case of noncompliance with the spec, a negative judgment is made at Step 38 and the program advances to Step 46. On the other hand, in a case of compliance with the spec, an affirmative judgment is made at Step 38 and the program advances to Step 40.

At Step 40, the control portion 26 attempts to communicate with the device selected at Step 36 by utilizing the security setting information which exists in the security setting information storage area 38. In a case where the same one as the security setting information which exists in the security setting information storage area 38 is set in the device selected at Step 36, the communication becomes successful. In this case, the control portion 26 can obtain status information from the device. In a case where the communication becomes successful, the control portion 26 makes an affirmative judgment at Step 42. In this case, the control portion 26 causes the success setting information storage area 40 (refer to FIG. 7) to store an association of the device (that is, an IP address) selected at Step 36 and the security setting information which exists in the security setting information storage area 38 (at Step 44). It should be noted that in a case where any security setting information associated with the device selected at Step 36 has already existed in the success setting information storage area 40, the control portion 26 overwrites the security setting information. In other words, according to this embodiment, only the past single success setting information per device is stored in the success setting information storage area 40.

On the other hand, there may be a case where, even though communication is attempted at Step 40, communication becomes unsuccessful. For example, in a case where the security setting information which exists in the security information storage area 38 differs from the security setting information which is set in the device selected at Step 36, communication becomes unsuccessful. The control portion 26 determines that the communication has been unsuccessful in a case where no reply comes back within a prescribed time period after the attempt is made. In other words, the control portion 26 makes a negative judgment at Step 42. In this case, the control portion 26 writes the device (that is, an IP address) selected at Step 36 into an error list (at Step 46). The error list is prepared in the storage area 42 of the storage portion 28.

When Step 44 or Step 46 is completed, the control portion 26 deletes the device selected at Step 36 from the uncommunication list (at Step 48). Subsequently, the control portion 26 returns to Step 34 to determine whether or not other devices exist in the uncommunication list. The processes at Steps 36 through 48 are carried out until no device exists in the uncommunication list. In a case where all the devices are completely cleared away, a negative judgment is made at Step 34 and the program advances to Step 60 shown in FIG. 10.

At Step 60, the control portion 26 determines whether or not any device exists in the error list. In a case where a negative judgment is made here, the communication process ends. In this case, it turns out that status information has been obtained from all the printer devices subject to communication. The control portion 26 may display the status information of each printer device on the display portion 22 (refer to FIG. 2).

On the other hand, an affirmative judgment is made at Step 60, the control portion 26 writes all the devices (that is, IP addresses) exist in the error list into the uncommunication list (at Step 62). Subsequently, the control portion 26 clears the error list (at Step 64). Then, the control portion 26 determines whether or not the communication is attempted by utilizing every default context of each device which exists in the uncommunication list (at Step 66). This process will be fully described next.

For example, in a case where the IP address written into the uncommunication list at Step 62 is "192.168.0.2," the control portion 26 carries out the following processes. The control portion 26 specifies a vendor name "X" and a product name "FAXPRINT-01" by retrieving the device table storage area 34 (refer to FIG. 4) in such a manner that "192.168.0.2" is rendered as a key. Subsequently, the control portion 26 specifies the default context "Xcompany" by retrieving the spec table storage area 32 (refer to FIG. 3) in such a manner that the vendor name "X" and the product name "FAXPRINT-01" are rendered as keys. Although not shown in the flow chart of FIG. 9, the control portion 26 causes the storage area 42 (refer to FIG. 2) of the storage portion 28 to store a history of the context which is utilized when the communication is attempted at Step 40. The control portion 26 determines whether or not the default context "Xcompany" specified is stored in the storage area 42. In a case where a negative judgment is made here, the control portion 26 changes the context of the security setting information storage area 38 into the "Xcompany" (at Step 68). Subsequently, the control portion 26 returns to Step 34 shown in FIG. 9 to carry out the processes from Step 36 and onward. In other words, the control portion 26 carries out the process at Step 38 or Step 40 by utilizing the security setting information after the change.

Figure 11:
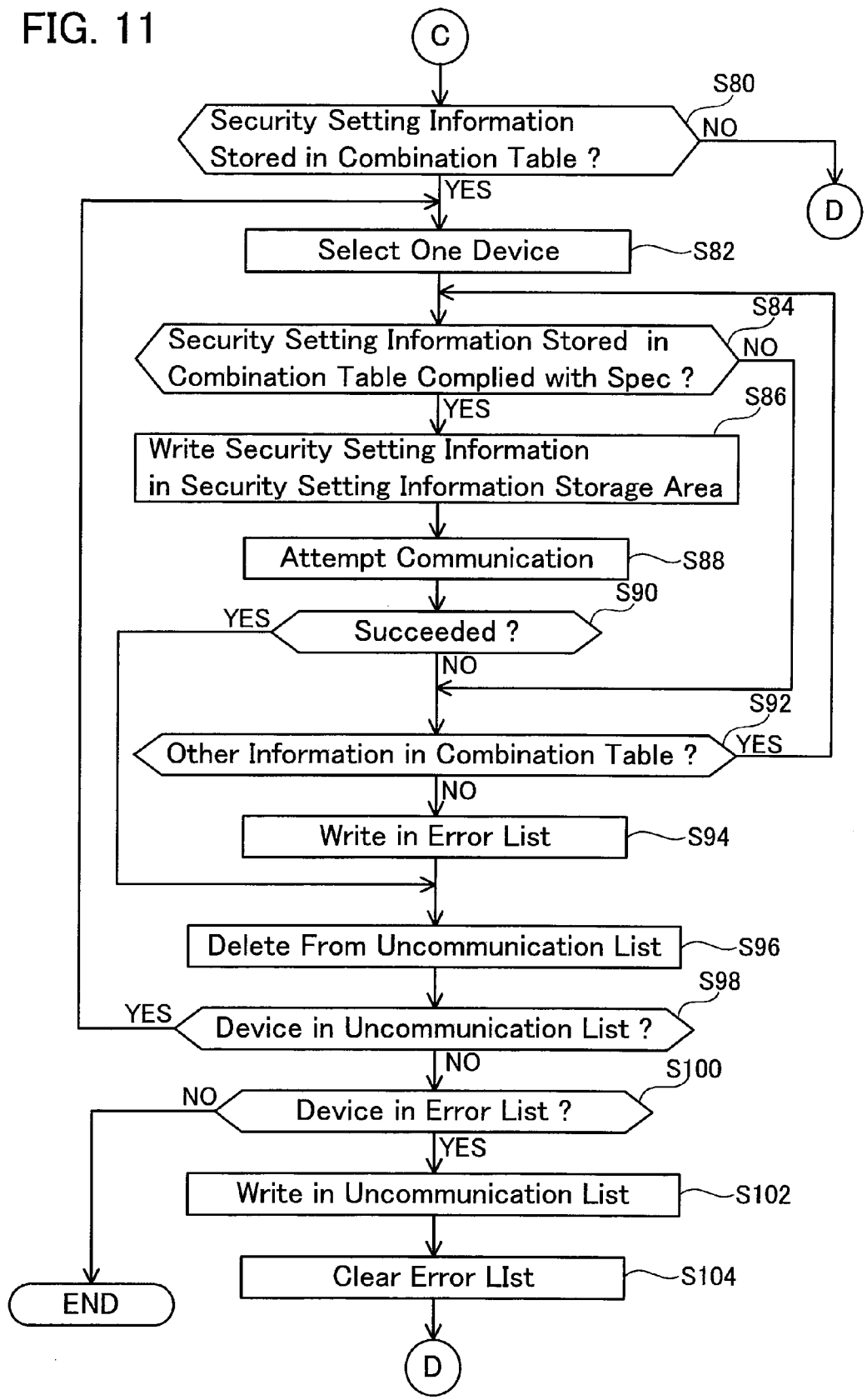
FIG. 11 shows a flow chart subsequent to FIG. 10.

On the other hand, in a case where an affirmative judgment is made at Step 66, the program advances to Step 80 shown in FIG. 11. At Step 80, the control portion 26 determines whether or not the security setting information is stored in the combination table storage area 36 (refer to FIG. 5) (at Step 80). In a case where a negative judgment is made here, the program advances to Step 120 shown in FIG. 12. On the other hand, in a case where an affirmative judgment is made at Step 80, the control portion 26 selects one device from the uncommunication list (at Step 82). Subsequently, the control portion 26 determines whether or not the security setting information (numerical symbol 160 in an example of FIG. 5.) at the head of the combination table storage area 36 complies with the spec associated with the device selected at Step 82 (at Step 84). Determination on compliance or noncompliance with the spec is made similarly to the above process at Step 38 shown in FIG. 9. In a case where a negative judgment is made at Step 84, the program skips Steps 86 through 90 and then advances to Step 92. On the other hand, in a case where an affirmative judgment is made at Step 84, the program advances to Step 86.

At Step 86, the control portion 26 writes the security setting information (numerical symbol 160 in an example of FIG. 5) at the head of the combination table storage area 36 into the security information storage area 38. Subsequently, the control portion 26 attempts to communicate with the device selected at Step 82 by utilizing the security setting information which exists in the security setting information storage area 38 (at Step 88). In a case where the communication becomes successful, the program skips Step 92 and Step 94 and then advances to Step 96. On the other hand, in a case where the communication becomes unsuccessful, the program advances to Step 92.

At Step 92, the control portion 26 determines whether or not any other security setting information exists in the combination table storage area 36. In the case of an example shown in FIG. 5, there is the security setting information to which numerical symbol 170 is attached. In this case, an affirmative judgment is made at Step 92. The control portion 26 carries out the processes at Steps 84 through 90 by utilizing other security setting information. On the other hand, in a case where a negative judgment is made at Step 92, the control portion 26 writes the device selected at Step 82 into the error list (at Step 94).

In a case where an affirmative judgment is made at Step 90 or the process at Step 94 is carried out, the control portion 26 deletes the device, which is selected at Step 82, from the uncommunication list (at Step 96). Subsequently, the control portion 26 determines whether or not other devices exist in the uncommunication list (at Step 98). In a case where an affirmative judgment is made here, the control portion 26 carries out the processes at Steps 82 through 96 again for other devices which exist in the uncommunication list.

On the other hand, in a case where a negative judgment is made at Step 98, the control portion 26 determines whether or not any device exists in the error list (at Step 100). In a case where a negative judgment is made here, the communication process ends. In a case where an affirmative judgment is made at Step 100, the control portion 26 writes all the devices which exist in the error list into the uncommunication list (at Step 102). Subsequently, the control portion 26 clears the error list (at Step 104). In this case, the program advances to Step 120 shown in FIG. 12.

At Step 120, the control portion 26 selects one device from the uncommunication list. The control portion 26 determines whether or not any success setting information associated with the device selected at Step 120 exists (at Step 122). The control portion 26 retrieves the success setting information storage area 40 (refer to FIG. 7) by rendering the device selected at Step 120 as a key. In a case where the security setting information is specified due to the retrieval, an affirmative judgment is made at Step 122. In this case, the control portion 26 writes the security setting information specified at Step 122 into the security setting information storage area 38. Next, the control portion 26 attempts to communicate with the device selected at Step 120 by utilizing the security setting information which exists in the security setting information storage area 38 (at Step 126). In a case where the communication becomes successful, an affirmative judgment is made at Step 128 and the program advances to Step 136 skipping Steps 130 through 134. On the other hand, in a case where the communication does not become successful, a negative judgment is made at Step 128 and the program advances to Step 130.

At Step 130, the control portion 26 determines whether or not any default security setting information associated with the device selected at Step 120 exists. The control portion 26 specifies a vendor name and a product name by retrieving the device table storage area 34 (refer to FIG. 4) in such a manner that the device selected at Step 120 is rendered as a key. Next, the control portion 26 specifies default security setting information by retrieving the spec table storage area 32 (refer to FIG. 3) in such a manner that the vendor name and product name specified are rendered as keys. For example, in a case where the vendor name is "X" and the product name is "OFFICELASER-100," a default user name "root," a default authentication key "root," a default encryption key "root," and a default context "Ycompany" are specified. In a case where the default security setting information is specified, the control portion 26 makes an affirmative judgment at Step 130. In this case, the program advances to Step 132. On the other hand, in a case where the vendor name and the product name cannot be specified or the default security setting information cannot be specified based on the vendor name and the product name, the control portion 26 makes a negative judgment at Step 130. In this case, the program advances to Step 136 skipping Step 132 and Step 134.

At Step 132, the control portion 26 writes the default security setting information specified at Step 130 into the security setting information storage area 38. Next, the control portion 26 attempts to communicate with the device selected at Step 120 by utilizing the security setting information which exists in the security setting information storage area 38 (at Step 134). The program advances to Step 136 whether or not the communication becomes successful at Step 134. At Step 136, the control portion 26 deletes the device, which is selected at Step 120, from the uncommunication list. Then, the control portion 26 determines whether or not any other device exits in the communication list (at Step 138). In a case where an affirmative judgment is made here, the control portion 26 carries out again the processes at Steps 120 through 136 for some other device which exists in the uncommunication list. On the other hand, in a case where a negative judgment is made at Step 138, the communication process ends.

The printer network system 10 according to this embodiment will be described in detail. The management device 20 stores a spec of the security setting information capable of being set in each of the printer devices 82 to 88. The management device 20 utilizes security setting information, which complies with the spec, at the time of attempting to communicate with each of the printer devices 82 to 88. The management device 20 does not attempt to carry out communication by using security setting information which does not comply with the spec (in a case where a negative judgment is made at Step 20 shown in FIG. 9 or at Step 84 shown in FIG. 11). As described above, in the process at Step 42 or the like shown in FIG. 9, the management device 20 determines that the communication becomes unsuccessful in a case where no reply comes back after a prescribed time period has elapsed since the attempt to communicate was made. In a case where, by way of experiment, communication with a lot of external devices is attempted by utilizing security setting information which does not comply with the spec, a huge amount of time period is required for the process at Step 42 or the like shown in FIG. 9. On the other hand, the management device 20 according to this embodiment will not attempt communication in a case where communication failure is expected due to failure in compliance with the spec. Therefore, the management device 20 is capable of efficiently communicating with the plurality of types of printer devices 82 to 88.

A part of technique disclosed in the above embodiment will be described below. The communication device described above can be expressed as follows. In other words, the communication device described above may be further provided with a first communication setting information storage device configured to store communication setting information for communicating with an external device. In this case, the communication attempt device may carry out the following processes:

(1) to determine, for each external device, whether the communication setting information stored in the first communication setting information storage device complies with the spec associated with the type of external device;

(1-1) to attempt to communicate with an external device for which a positive determination has made in the above (1) by utilizing the communication setting information stored in the first communication setting information storage device; and (1-2) to refrain from attempting to communicate with an external device for which a negative determination has made in the above (1) by utilizing the communication setting information stored in the first communication setting information storage device.

Further, the spec storage device described above may be configured to store an association of a type of external device, a spec of communication setting information which is capable of being set in the external device, and default communication setting information. In this case, the communication attempt device may attempt to communicate with the external device by utilizing the default communication setting information associated with the type of external device in a case where the negative determination has been made in the above (1). In this configuration, the communication device is able to attempt to communicate with the external device, to which communication failure is expected with the utilization of the communication setting information stored in the first communication setting information storage device, by alternatively utilizing the default communication setting information of the external device.

The communication device described above may be further provided with a second communication setting information storage device configured to store a plurality of communication setting information and a changing device. The changing device may be configured to change the communication setting information from the information stored in the first communication setting information storage device to any of the plurality of communication setting information stored in the second communication setting information storage device, in a case where the external device for which the negative determination has made in the above (1) exists. In this case, the communication attempt device may carry out the following processes:

(2) to determine whether or not the communication setting information after the change complies with the spec associated with the type of external device for which the negative determination has made in the above (1);

(2-1) to attempt to communicate with an external device for which a positive determination has made in the above (2) by utilizing the communication setting information after the change; and (2-2) to refrain from attempting to communicate with an external device for which a negative determination has made in the above (2) by utilizing the communication setting information after the change.

According to the configuration described above, the communication device is able to attempt to communicate with the external device, to which communication failure is expected with the utilization of the communication setting information stored in the first communication setting information storage device, by alternately utilizing another communication setting information after the change. Determination of whether the communication setting information after the change complies with the spec is also made, and whereby communication will not be attempted in a case where communication failure is expected.

There is no particular limitation on the technique for distinguishing types of external devices. For example, types of external devices may be distinguished based on manufacturers of the external devices. In other words, a type of external device stored in the spec storage device may be represented by vendor information of the external device. In this case, the type obtaining device may be configured to obtain at least vendor information of each external device.

Further, for example, types of external devices may be distinguished based on product information (for example, a product name and a product number) of the external devices. In other words, a type of external device stored in the spec storage device may be at least a combination of vendor information of the external device and product information of the external device. In this case, the type obtaining device may be configured to obtain at least vendor information and product information of each external device. Depending on a manufacturer and/or a product of an external device, there is a strong possibility that a spec of communication setting information capable of being set in the external device also differs. Therefore, it is preferable that communication setting information which is used for communication with an external device is determined based on vendor information and/or product information. In this configuration, specifying vendor information and/or product information of an external device means specifying a spec of communication setting information of the external device.

The communication setting information described above may be security communication setting information including at least one out of a user name, an authentication key, an encryption key, and a context. The communication setting information may be another type of communication setting information.

There is no particular limitation on technique for obtaining type of each external device by the type obtaining device. For example, the communication device may allow a user to input type information of each external device. In this case, the type obtaining device may obtain the type of each external device based on information which is input by the user. Further, the type obtaining device may obtain the type of each external device by communicating with each external device. In this case, if communication for which the security communication setting information is utilized is carried out, there is a possibility that the type of external device cannot be obtained in a case where security communication setting information associated with the communication is not set in the external device. Therefore, the type obtaining device may obtain the type of each external device by carrying out communication without using the security communication setting information. According to this configuration, the type obtaining device can obtain the type information of each external device without fail.

The communication device may obtain status information of each external device. If there is an external device with which the communication device cannot establish communication by using particular communication setting information, the communication device may attempt to communicate with the external device utilizing the other communication setting information. The other communication setting information may be default communication setting information of the external device with which communication was unsuccessful. Further, the other communication setting information may be designated by a user. Furthermore, the other communication setting information may be information which was usable in the past for communicating with the external device.

The embodiment described above can be modified in various ways. Modifications of the embodiment described above will be described below.

(1) In the communication processes according to the embodiment described above, the management device 20 obtains status information of each of the printer devices 82 to 88. However, purpose of the communication by the management device 20 is not limited to acquisition of the status information. For example, the management device 20 may obtain another type of information. Also, the purpose of communication carried out by the management device 20 is not limited to such information obtainment. For example, the management device 20 may communicate with each of the printer devices 82 to 88 so as to give prescribed instructions to each of the printer devices 82 to 88 (for example, instructions to change the setting).

(2) According to the embodiment described above, the management device 20 carries out the device information obtaining process by communicating with each of the printer devices 82 to 88. However, a user may input an IP address, a vendor name, and a product name of each of the printer devices 82 to 88 into the management device 20. In this case, the management device 20 may carry out the device information obtaining process by analyzing the information which is input by the user.

Figure 12:
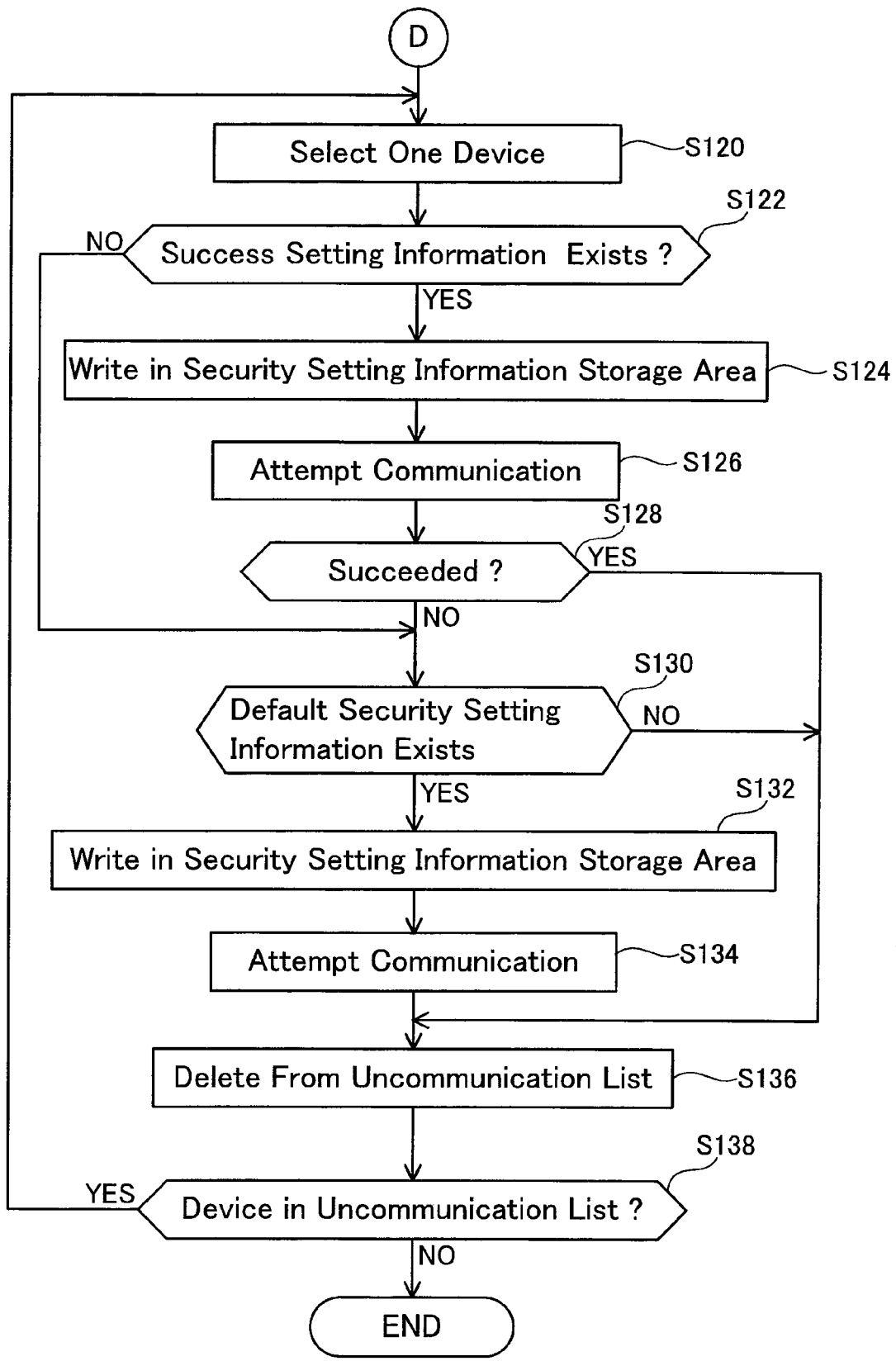
FIG. 12 shows a flow chart subsequent to FIG. 11.

(3) In a case where an affirmative judgment is made at Step 90 shown in FIG. 11, an affirmative judgment is made at Step 128 shown in FIG. 12, or the communication attempted at Step 134 shown in FIG. 12 becomes successful, information may be written into the success setting information storage area 40. For example, in a case where an affirmative judgment is made at Step 90 shown in FIG. 11, an association of an IP address of the device selected at Step 82 shown in FIG. 11 and the security setting information by which the communication becomes successful may be stored. Further, for example, in a case where an affirmative judgment is made at Step 128 shown in FIG. 12 or the communication attempted at Step 134 shown in FIG. 12 becomes successful, an association of an IP address of the device selected at Step 120 and the security setting information by which the communication becomes successful may be stored.

(4) According to the embodiment described above, an association of an IP address of the device and the newest one security setting information by which the communication becomes successful is stored in the success setting information storage area 40. However, an association of an IP address of the device and histories of a plurality of the past security setting information by which the communication became successful may be stored in the success setting information storage area 40. In this case, the control portion 26 may attempt to communicate with a device by utilizing each of a plurality of security setting information associated with the device one by one (for example, in a manner of tracing back to the past).

Figure 9:
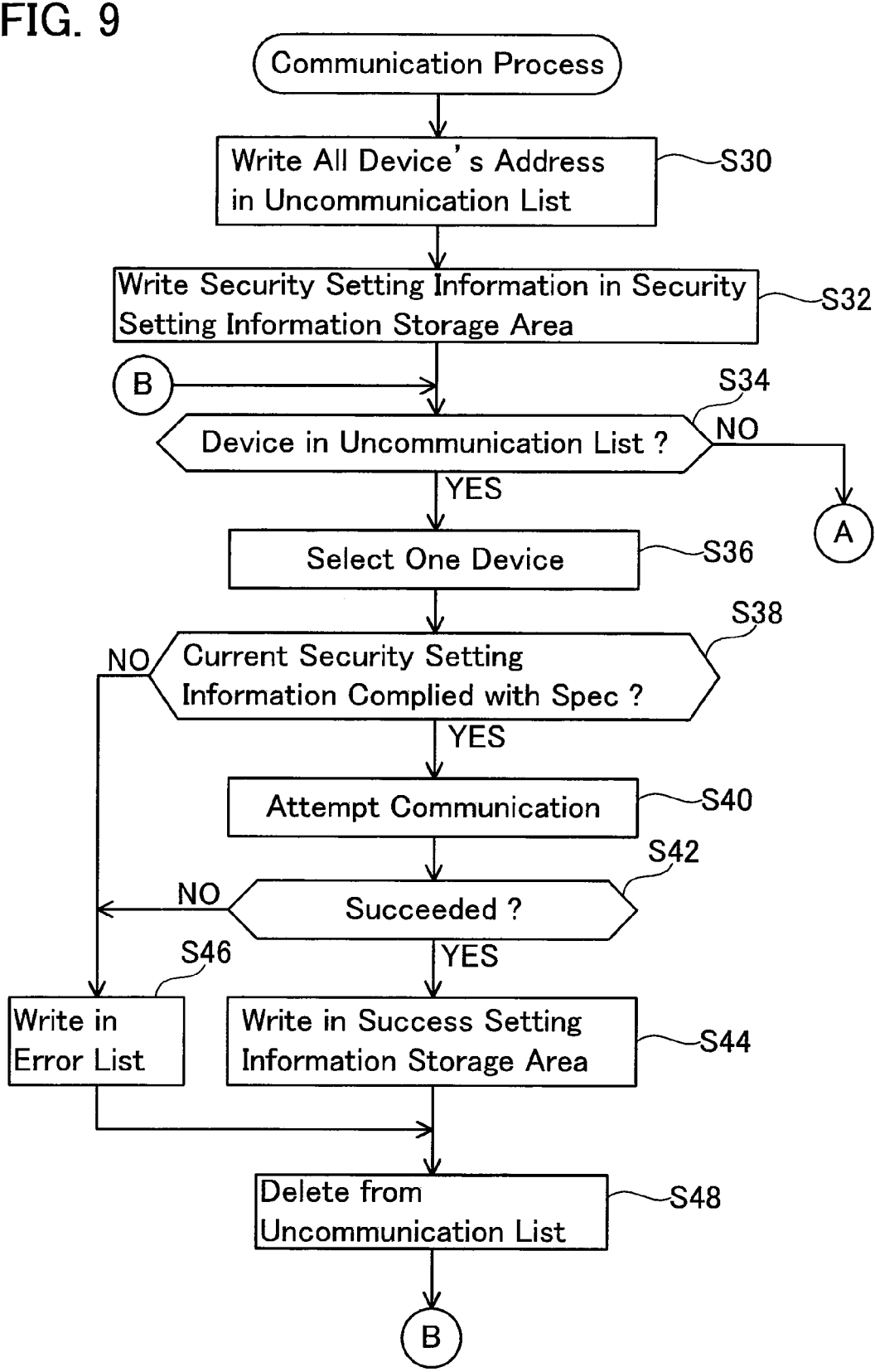
FIG. 9 shows a flow chart of a communication process.
Figure 10:
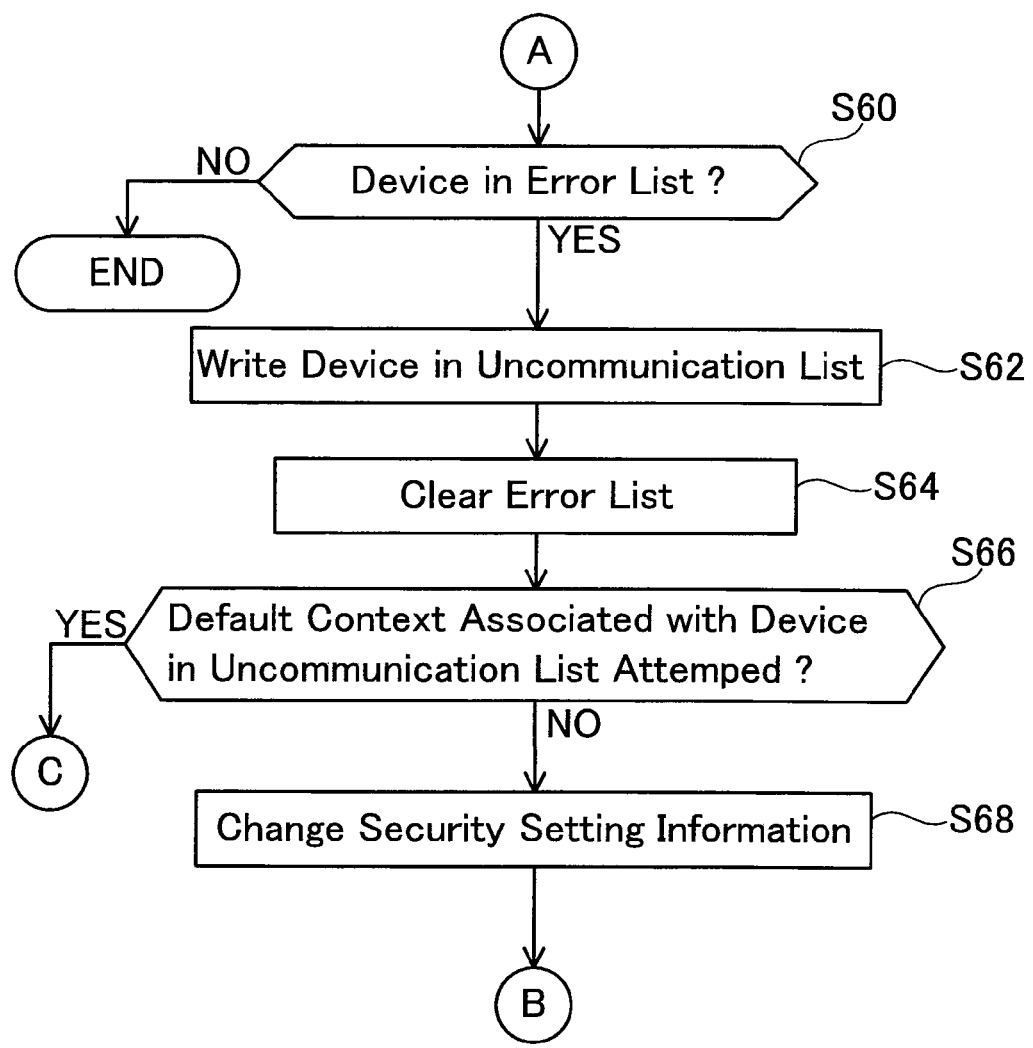
FIG. 10 shows a flow chart subsequent to FIG. 9.

(5) According to the embodiment described above, the communication with the device which is written into the error list at Step 46 shown in FIG. 9 is attempted, changing the security setting information in the following order.

(A) The communication is attempted again by utilizing a default context (at Steps 66, 68, and 40).

(B) The communication is attempted again by utilizing security setting information in the combination table storage area 36 (at Steps 86 and 88).

(C) The communication is attempted again by utilizing security setting information in the success setting information storage area 40 (at Steps 124 and 126).

(D) The communication is attempted again by utilizing default security setting information (at Steps 132 and 134).

However, the order of changing the security setting information is not limited to the order of (A) to (D) described above. The order of (A) to (D) described above can be changed. For example, it is possible to carry out (C) described above first and subsequently (A), (B), and (D).

What is claimed is:

1. A communication device for managing a plurality of printers, the plurality of printers including a first type of one or more printers, a second type of one or more printers, and a third type of one or more printers, the communication device comprising:
   a spec storage device configured to store an association of a type of printer and a spec of communication setting information which is capable of being set in the type of printer, wherein a first spec of communication setting information which is capable of being set in the first type of printer is different from a second spec of communication setting information which is capable of being set in the second type of printer, and a third spec of communication setting information which is capable of being set in the third type of printer is the same as the first spec of communication information which is capable of being set in the first type of printer;
   a type obtaining device configured to obtain the first, second, or third type of each printer;
   a communication attempt device configured to attempt to communicate with each printer;
   a first communication setting information storage device configured to store particular communication setting information complying with the first spec associated with the first type of printer;
   a second communication setting information storage device configured to store a plurality of communication setting information which is different from the particular communication setting information; and
   a changing device configured to change communication setting information to be utilized from the particular communication setting information to any of the plurality of communication setting information,
   wherein the communication attempt device:
   (1) determines, for each of the plurality of printers, whether the particular communication setting information complies with the spec associated with the type of printer;
   (1-1) attempts to communicate by utilizing the particular communication setting information with a first printer included in the plurality of printers, the first printer being a printer for which a positive determination has been made in the above (1), and the first printer being included in one of the first type of one or more printers and the third type of one or more printers; and
   (1-2) refrains from attempting to communicate by utilizing the particular communication setting information with a second printer included in the plurality of printers, the second printer being a printer for which a negative determination has been made in the above (1), and the second printer being included in the second type of one or more printers;

wherein the changing device changes the communication setting information to be utilized from the particular communication setting information to any of the plurality of communication setting information in a case where the second printer exists, and wherein the communication attempt device further:

(2) determines whether communication setting information after the change complies with the second spec associated with the second type of printer;

(2-1) attempts to communicate by utilizing the communication setting information after the change with the second printer in a case where a positive determination has been made in the above (2); and (2-2) refrains from attempting to communicate by utilizing the communication setting information after the change with the second printer in a case where a negative determination has been made in the above (2).

2. The communication device as in claim 1, wherein the spec storage device stores an association of a type of printer, a spec of communication setting information which is capable of being set in the type of printer, and default communication setting information, and in the case where the negative determination has been made in the above (2), the communication attempt device attempts to communicate with the second printer by utilizing the default communication setting information associated with the second type of the printer.

3. The communication device as in claim 1, wherein the types of printers are classified by at least vendors of printers, the type of printer stored in the spec storage device includes at least vendor information of the printer, and the type obtaining device obtains at least the vendor information of each printer.

4. The communication device as in claim 3, wherein the types of printers are classified by at least vendors and product names of printers, the type of printer stored in the spec storage device includes a combination of at least vendor information of the printer and product name information of the printer, and the type obtaining device obtains at least the vendor information and product name information of each printer.

5. The communication device as in claim 1, wherein the communication setting information is security communication setting information including at least one information of a user name, an authentication key, an encryption key, and a context.

6. The communication device as in claim 5, wherein the type obtaining device obtains the type of each printer by communicating without utilizing the security communication setting information.

7. The communication device as in claim 6, wherein the type obtaining device obtains a type of each printer by communicating with each printer in accordance with Simple Network Management Protocol version 1 without utilizing the security communication setting information, and the communication attempt device attempts to communicate with each printer in accordance with Simple Network management Protocol version 3 by utilizing the security communication setting information.

8. The communication device as in claim 1, wherein the first spec includes a number of letters of an authentication key which is capable of being set in the first type of printer, the second spec includes a number of letters of an authentication key which is capable of being set in the second type of printer, the third spec includes a number of letters of an authentication key which is capable of being set in the third type of printer, the number of letters of the authentication key included in the first spec is different from the number of letters of the authentication key included in the second spec, the number of letters of the authentication key included in the third spec is the same as the number of letters of the authentication key included in the first spec, a number of letters of a particular authentication key included in the particular communication setting information complies with the number of letters of the authentication key included in the first spec and the third spec, the number of letters of the particular authentication key does not comply with the number of letters of the authentication key included in the second spec, in the above (1), the communication attempt device determines, for each of the plurality of printers, whether the particular communication setting information complies with the spec associated with the type of the printer by checking whether the number of letters of the particular authentication key complies with a number of letters of an authentication key included in the spec associated with the type of the printer, and in the above (2), the communication attempt device determines whether the communication setting information after the change complies with the second spec associated with the type of the second printer by checking whether a number of letters of an authentication key included in the communication setting information after the change complies with the number of letters of the authentication key included in the second spec associated with the second type of the printer.

9. A non-transitory computer readable medium storing a computer program for a communication device for managing a plurality of printers, the plurality of printers including a first type of one or more printers, a second type of one or more printers, and a third type of one or more printers, the computer program including instructions for ordering a computer mounted on the communication device to perform:

storing an association of a type of printer and a spec of communication setting information which is capable of being set in the type of printer, wherein a first spec of communication setting information which is capable of being set in the first type of printer is different from a second spec of communication setting information which is capable of being set in the second type of printer, and a third spec of communication setting information which is capable of being set in the third type of printer is the same as the first spec of communication information which is capable of being set in the first type of printer;

obtaining the first, second, or third type of each printer;

attempting to communicate with each printer;

storing particular communication setting information complying with the first spec associated with the first type of printer;

storing a plurality of communication setting information which is different from the particular communication setting information; and changing communication setting information to be utilized from the particular communication setting information to any of the plurality of communication setting information, wherein the attempting includes:
(1) determining, for each of the plurality of printers, whether the particular communication setting information complies with the spec associated with the type of printer;
(1-1) attempting to communicate by utilizing the particular communication setting information with a first printer included in the plurality of printers, the first printer being a printer for which a positive determination has been made in the above (1), and the first printer being included in one of the first type of one or more printers and the third type of one or more printers; and
(1-2) refraining from attempting to communicate by utilizing the particular communication setting information with a second printer included in the plurality of printers, the second printer being a printer for which a negative determination has been made in the above (1), and the second printer being included in the second type of one or more printers;

wherein in the changing, the communication setting information to be utilized is changed from the particular communication setting information to any of the plurality of communication setting information in a case where the second printer exists, and wherein the attempting further includes:
(2) determining whether communication setting information after the change complies with the second spec associated with the second type of printer;
(2-1) attempting to communicate by utilizing the communication setting information after the change with the second printer in a case where a positive determination has been made in the above (2); and
(2-2) refraining from attempting to communicate by utilizing the communication setting information after the change with the second printer in a case where a negative determination has been made in the above (2).

10. A communication device for managing a plurality of printers, the plurality of printers including a first type of one or more printers, a second type of one or more printers, and a third type of one or more printers, the communication device comprising:

a spec storage device configured to stores an association of a type of printer and a spec of communication setting information which is capable of being set in the type of printer, wherein a first spec of communication setting information which is capable of being set in the first type of printer is different from a second spec of communication setting information which is capable of being set in the second type of printer, and a third spec of communication setting information which is capable of being set in the third type of printer is the same as the first spec of communication information which is capable of being set in the first type of printer;

a first communication setting information storage device configured to store particular communication setting information complying with the first spec associated with the first type of printer;
a second communication setting information storage device configured to store a plurality of communication setting information which is different from the particular communication setting information;
a processing device; and
memory storing computer executable instructions, which when executed by the processing device cause the communication device to provide:
a type obtaining device configured to obtain the first, second, or third type of each printer;
a communication attempt device configured to attempts to communicate with each printer, wherein the communication attempt device:
(1) determines, for each of the plurality of printers, whether the particular communication setting information complies with the spec associated with the type of printer;
(1-1) attempts to communicate by utilizing the particular communication setting information with a first printer included in the plurality of printers, the first printer being a device for which a positive determination has been made in the above (1), and the first printer being included in one of the first type of one or more printers and the third type of one or more printers; and
(1-2) refrains from attempting to communicate by utilizing the particular communication setting information with a second printer included in the plurality of printers, the second printer being a device for which a negative determination has been made in the above (1), and the second printer being included in the second type of one or more printers;
a changing device configured to changes communication setting information to be utilized from the particular communication setting information to any of the plurality of communication setting information, wherein the changing device changes the communication setting information to be utilized from the particular communication setting information to any of the plurality of communication setting information in a case where the second printer exists, and
wherein the communication attempt device further:
(2) determines whether communication setting information after the change complies with the second spec associated with the second type of printer;
(2-1) attempts to communicate by utilizing the communication setting information after the change with the second printer in a case where a positive determination has been made in the above (2); and
(2-2) refrains from attempting to communicate by utilizing the communication setting information after the change with the second printer in a case where a negative determination has been made in the above (2).

* * * * *

UNITED STATES PATENT AND TRADEMARK OFFICE
CERTIFICATE OF CORRECTION

PATENT NO. : 8,275,861 B2
APPLICATION NO. : 12/276684
DATED : September 25, 2012
INVENTOR(S) : Sunao Kawai It is certified that error appears in the above-identified patent and that said Letters Patent is hereby corrected as shown below:

In the Claims

Column 17, Claim 10, Line 48:
  Please replace "to stores an association" with --to store an association--

Column 18, Claim 10, Line 15:
  Please replace "to attempts to communicate" with --to attempt to communicate--

Column 18, Claim 10, Line 37:
  Please replace "to changes communication" with --to change communication--

Signed and Sealed this
Ninth Day of July, 2013

Teresa Stanek Rea
*Acting Director of the United States Patent and Trademark Office*